US012620192B2

(12) United States Patent
Shin et al.

(10) Patent No.: US 12,620,192 B2
(45) Date of Patent: \*May 5, 2026

(54) METHOD AND APPARATUS FOR IMPROVING OBJECT IMAGE

(71) Applicant: PIXTREE, INC., Seoul (KR)

(72) Inventors: Jaeseob Shin, Seoul (KR); Sungul Ryoo, Seoul (KR); Sehoon Son, Seoul (KR); Hyeongduck Kim, Gyeonggi-do (KR); Hyosong Kim, Seoul (KR); Kyunghwan Ko, Seoul (KR)

(73) Assignee: PIXTREE, INC., Seoul (KR)

( * ) Notice: Subject to any disclaimer, the term of this patent is extended or adjusted under 35 U.S.C. 154(b) by 386 days.

This patent is subject to a terminal disclaimer.

(21) Appl. No.: 18/075,406

(22) Filed: Dec. 5, 2022

(65) Prior Publication Data

US 2023/0095142 A1 Mar. 30, 2023

Related U.S. Application Data

(63) Continuation-in-part of application No. PCT/KR2021/007013, filed on Jun. 4, 2021.

(30) Foreign Application Priority Data

Jun. 5, 2020 (KR) ........................ 10-2020-0068166

(51) Int. Cl.
*G06V 10/25* (2022.01)
*G06T 3/18* (2024.01)
(Continued)

(52) U.S. Cl.
CPC ................ *G06V 10/25* (2022.01); *G06T 3/18* (2024.01); *G06T 3/4053* (2013.01); *G06T 5/50* (2013.01);
(Continued)

(58) Field of Classification Search
CPC G06T 5/50; G06T 3/18; G06T 3/4053; G06T 7/337; G06T 2207/20081;
(Continued)

(56) References Cited

U.S. PATENT DOCUMENTS 6,496,606 B1 \* 12/2002 Boutroux ............... G06V 10/24
382/284
10,426,442 B1 \* 10/2019 Schnorr ............... A61B 8/5223
(Continued)

FOREIGN PATENT DOCUMENTS

EP 3703008 A1 \* 9/2020
KR 20000054305 A 9/2000
(Continued)

OTHER PUBLICATIONS

Silva, Sergio Montazzolli, and Claudio Rosito Jung. "License plate detection and recognition in unconstrained scenarios." Proceedings of the European conference on computer vision (ECCV). 2018. (Year: 2018).\*
(Continued)

*Primary Examiner* — Gregory A Morse
*Assistant Examiner* — Stefano Anthony Dardano
(74) *Attorney, Agent, or Firm* — Revolution IP, PLLC

(57) ABSTRACT

Provided are a method and an apparatus for restoring an object image, capable of restoring an image naturally by detecting positions of landmarks of an object in a bounding-box detected from an input image, performing warping to align the object at a central position or a reference position on the basis of the landmarks, improving the image using a learning model learned from the aligned object image, performing inverse warping for rotating the improved object image in an original direction or at an original angle, and inserting the inversely-warped object image into the input image. In addition, provided are a method and an apparatus (Continued)

for restoring an object image, capable of detecting positions of landmarks of an object in a bounding-box detected from an input image, performing pose estimation for a side object on the basis of the landmarks, and improving an image using a learning model learned from a side object image corresponding to the pose estimation result.

11 Claims, 8 Drawing Sheets

(51) Int. Cl.
| | |
|---|---|
| *G06T 3/4053* | (2024.01) |
| *G06T 5/50* | (2006.01) |
| *G06T 7/33* | (2017.01) |
| *G06V 10/26* | (2022.01) |

(52) U.S. Cl.
CPC ............ *G06T 7/337* (2017.01); *G06V 10/273* (2022.01); *G06T 2207/20081* (2013.01)

(58) Field of Classification Search
CPC .. G06T 3/40; G06T 3/60; G06T 7/194; G06T 7/246; G06T 11/60; G06T 5/00–94; G06T 7/30–38; G06T 3/14; G06T 15/503; G06T 2207/20212–20224; G06V 10/273; G06V 10/225; G06V 10/26; G06V 10/454; G06V 10/82; G06V 40/16; G06V 10/25; G06V 40/165; G06V 10/24–248
See application file for complete search history.

(56) References Cited

U.S. PATENT DOCUMENTS

| | | | |
|---|---|---|---|
| 2006/0233430 A1* | 10/2006 | Kimura | ..................... G06T 7/30 |
| | | | 382/128 |
| 2010/0092085 A1* | 4/2010 | Marchesotti | ............ G06T 11/60 |
| | | | 382/254 |
| 2017/0256033 A1* | 9/2017 | Tuzel | .................... G06F 18/214 |
| 2018/0189937 A1* | 7/2018 | Bala | ......................... G06T 5/50 |
| 2019/0279393 A1 | 9/2019 | Ciuc et al. | |
| 2019/0392268 A1 | 12/2019 | Tariq et al. | |
| 2021/0350616 A1* | 11/2021 | Guizilini | ................... G06T 7/20 |

FOREIGN PATENT DOCUMENTS

| | | | | | |
|---|---|---|---|---|---|
| KR | 20100001409 A | | 1/2010 | | |
| KR | 20190128930 A | | 11/2019 | | |
| KR | 102223754 B1 | | 3/2021 | | |
| TW | I405143 B | * | 8/2013 | .......... | G06V 10/243 |
| WO | WO-2016050729 A1 | * | 4/2016 | .......... | G06V 40/169 |
| WO | WO-2020099876 A1 | * | 5/2020 | ............ | G06N 3/045 |

OTHER PUBLICATIONS

International Search Report for PCT/KR2021/007013, mailed Aug. 30, 2021.

* cited by examiner

Figure 1:
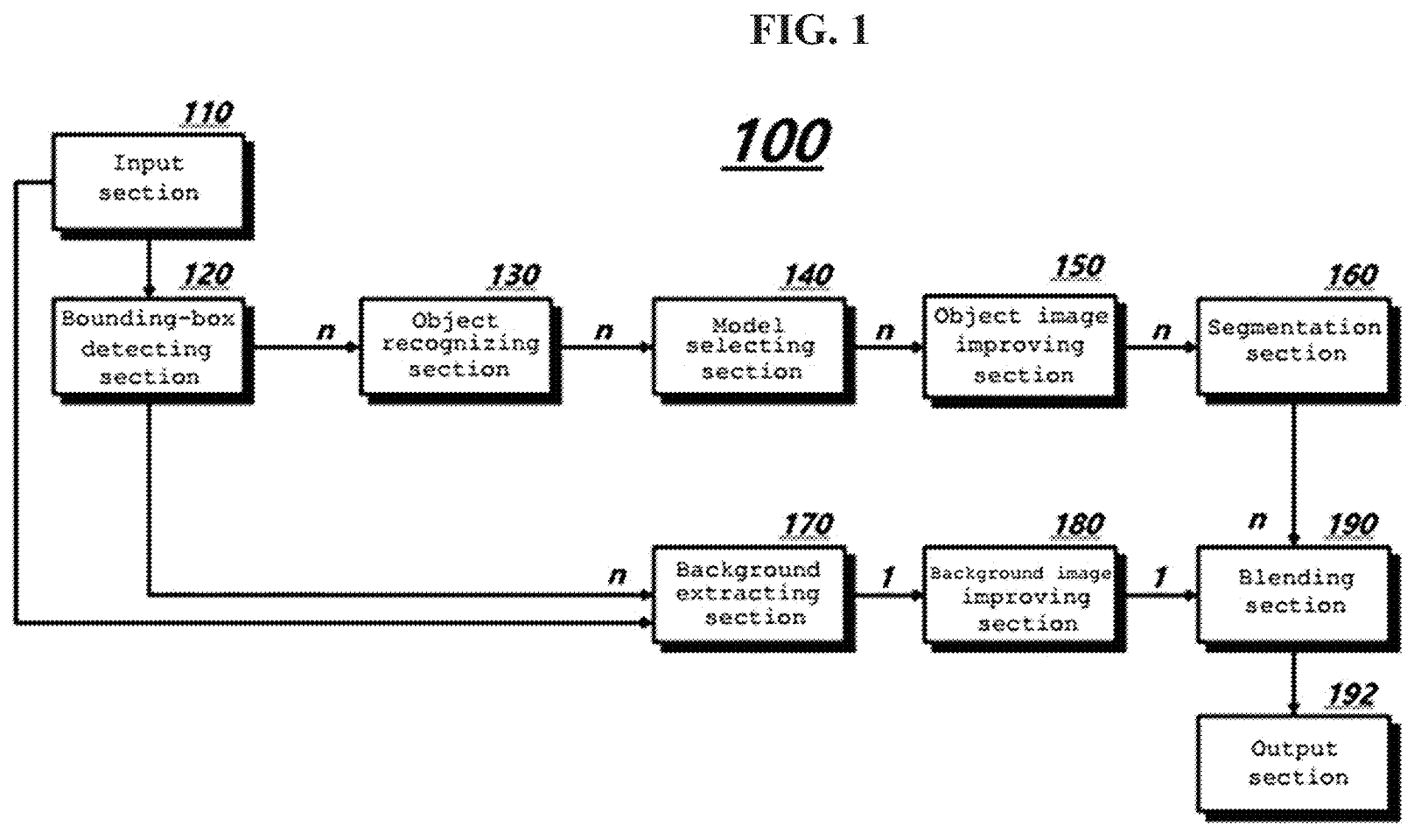

*110* Input section

*120* Bounding-box detecting section

*130* Object recognizing section

*140* Model selecting section

*150* Object image improving section

*160* Segmentation section

*170* Background extracting section

*180* Background image improving section

*190* Blending section

*192* Output section

Figure 2A:
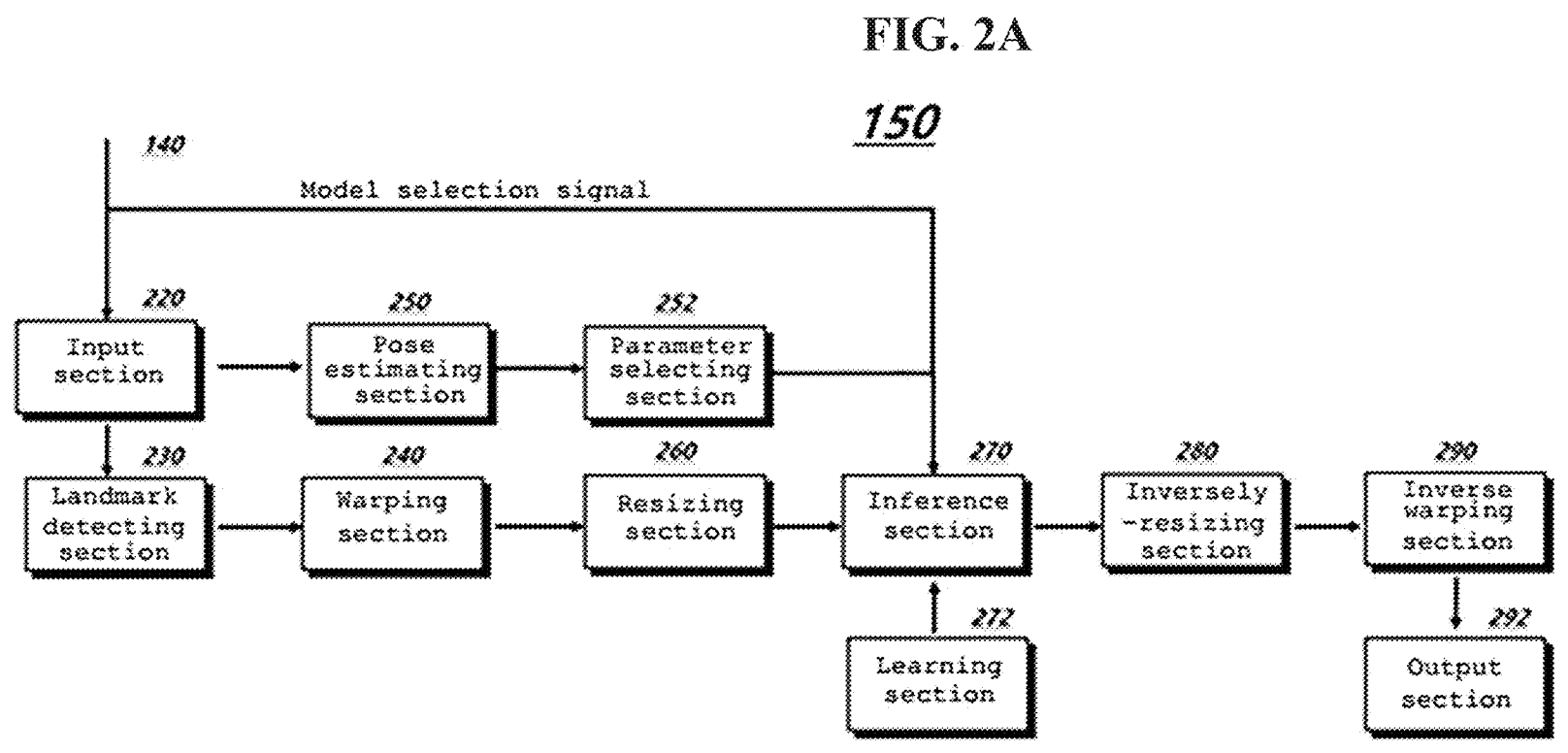

Model selection signal

140

220 Input section

230 Landmark detecting section

250 Pose estimating section

252 Parameter selecting section

240 Warping section

260 Resizing section

270 Inference section

272 Learning section

280 Inversely-resizing section

290 Inverse warping section

292 Output section

METHOD AND APPARATUS FOR IMPROVING OBJECT IMAGE

TECHNICAL FIELD

The present disclosure relates to a method and an apparatus for restoring an object image.

BACKGROUND ART

The contents described herein merely provide background information related to the present inventive concept, and do not constitute the prior art.

In general, techniques for restoring a low-resolution image to a high-resolution image are classified according to the number of input images used for restoration or restoring techniques. The techniques are classified into a single image super-resolution restoring technique and a continuous image super-resolution restoring technique, according to the number of input images.

Generally, the single image super-resolution image restoring technique has a faster processing speed than that of the continuous image super-resolution image restoring technique, but has a low quality of image restoration since information necessary for restoration is insufficient.

Since the continuous image super-resolution image restoring technique uses various features extracted from a plurality of consecutively acquired images, the quality of the restored image is superior to that of the single image super-resolution image restoring technique, but its algorithm is complicated and the amount of computation is large, thereby making it difficult to perform real-time processing.

As the restoring techniques, a technique using interpolation, a technique using edge information, a technique using frequency characteristics, or a technique using machine learning such as deep learning is used. The technique using learning such as deep learning is used. The technique using interpolation has a high processing speed, but has a disadvantage of blurring of edge parts.

The technique using edge information has a high processing speed and maintains the sharpness of edge parts, but has a disadvantage of a visually noticeable restoration error in a case where an edge direction is incorrectly estimated.

The technique using frequency characteristics maintains the sharpness of edge parts using high-frequency components similar to the technique using edge information, but has a disadvantage of occurrence of a ringing artifact near a boundary. Finally, the technique using machine learning such as example-based explanation or deep learning has the highest quality of restored images, but its processing speed is very slow.

As described above, among the various high-resolution image restoring techniques, the continuous image super-resolution image restoring technique may be applied to fields necessary for a digital zoom function using the existing interpolation method, and can provide images of superior quality compared to the interpolation-based image restoring technique. However, the existing super-resolution image restoring technique is limited in its application to electro-optical equipment that requires limited resources and real-time processing due to a large amount of computation.

The existing single image-based super-resolution image restoring technique capable of real-time processing has a problem in that performance is significantly reduced compared to the continuous image-based restoring technique in a case where an image needs to be enlarged with a high magnification of 2 times or more.

DISCLOSURE

Technical Problem

An object of the present inventive concept is to provide a method and an apparatus for restoring an object image capable of detecting a bounding-box including an object that is defined in advance, detecting landmarks of the object in the detected bounding-box, performing warping for aligning the object to be positioned at a central position or a reference position on the basis of the landmarks, improving the image using a learning model learned on the basis of the aligned object image, performing inverse warping for rotating the improved image in an original direction or at an original angle, and inserting the result into an input image to restore a natural image.

In addition, another object of the present inventive concept is to provide a method and an apparatus for restoring an object image capable of performing pose estimation on an object in a bounding-box detected from an input image, and improving the image using a learning model learned from a side object image corresponding to a result of the pose estimation.

Technical Solution

According to an aspect of the present inventive concept, there is provided an apparatus for improving an object image including: an input section that receives an input image; a bounding-box detecting section that detects a plurality of bounding-boxes from the input image; an object recognizing section that recognizes an object in each of the bounding-boxes; a background extracting section that extracts a background image from the input image; an object image improving section that detects landmarks that are main features of each object, performs warping for aligning an object position at a central position or a reference position on the basis of the landmarks to generate a warped object image, performs inference so as to improve the warped object image using a pre-learned object leaning model to generate an improved object image, and performs inverse warping for inverting the improved object image to the object position of the input image to generate an inversely-warped object image; a background image improving section that performs inference so as to improve the background image using a pre-learned background image learning model to generate an improved background image; a segmentation section that segments the inversely-warped object image; a blending section that blends the segmented inversely-warped object image and the improved background image to generate a blended image; and an output section that outputs the blended image as an output image.

According to another aspect of the present inventive concept, there is provided an apparatus for improving an object image including: an input section that receives a bounding-box including an object defined in advance; a landmark detecting section that detects landmarks that are main features of each object; a warping section that performs warping for aligning an object position at a central position or a reference position on the basis of the landmarks to generate a warped object image; an inference section that performs inference so as to improve the warped object image using a pre-learned object leaning model to generate an improved object image; an inverse warping section that performs inverse warping for inverting the improved object image to the object position of the bounding-box to generate an inversely-warped object image; and an output section that applies the inversely-warped object image to the bounding-box.

According to still another aspect of the present inventive concept, there is provided a method for improving an object image, including: receiving a bounding-box including an object defined in advance; detecting landmarks that are main feature of each object; performing warping for aligning an object position at a central position or a reference position on the basis of the landmarks to generate a warped object image; performing inference so as to improve the warped object image using a pre-learned object leaning model to generate an improved object image; performing inverse warping for inverting the improved object image to the object position of the bounding-box to generate an inversely-warped object image; and applying the inversely-warped object image to the bounding-box.

According to still another aspect of the present inventive concept, there is provided an apparatus for improving an object image including: an input section that receives a bounding-box including an object defined in advance; a pose estimating section that calculates an object angle in the bounding-box; a parameter selecting section that selects a parameter corresponding to the object angle; and an inference section that performs inference so as to improve the object image in the bounding-box using a learning model corresponding to the parameter to generate an improved object image.

According to still another aspect of the present inventive concept, there is provided a method for improving an object image, including: receiving a bounding-box including an object defined in advance; calculating an object angle in the bounding-box; selecting a parameter corresponding to the object angle; and performing inference so as to improve the object image using a learning model corresponding to the parameter to generate an improved object image.

Effects of the Inventive Concept

According to the present inventive concept, it is possible to detect positions of landmarks of an object in a bounding-box detected from an input image, perform warping to align the object at a central position or a reference position on the basis of the landmarks, resize the aligned object to a predetermined object size, improve the image using a learning model learned from the aligned object image, scale the improved image to an original size, perform inverse warping for rotating the object in an original direction or at an original angle, and insert the inversely-warped image into the input image to restore a natural image.

According to the present inventive concept, it is possible to perform pose estimation for an object in a bounding-box detected from an input image, and to improve an image using a learning model learned from a side object image corresponding to a pose estimation result.

DESCRIPTION OF DRAWINGS

FIG. 1 is a diagram illustrating an object image improving apparatus according to an exemplary embodiment of the invention.

FIGS. 2A and 2B are diagrams illustrating an object image improving section according to an exemplary embodiment of the invention.

DESCRIPTION OF REFERENCE NUMERALS

Figure 3:
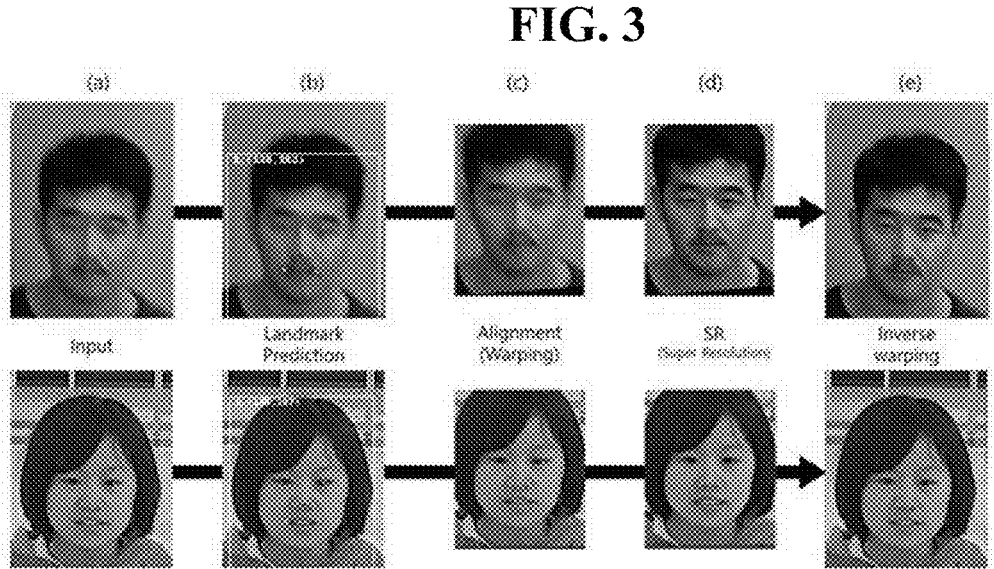
FIG. 3 is a diagram illustrating an object image improving process according to an exemplary embodiment of the invention.

100: Object image improving apparatus
110: Input section
120: Bounding-box detecting section
130: Object recognizing section
140: Model selecting section
150: Object image improving section
160: Segmentation section
170: Background extracting section
180: Background image improving section
190: Blending section
192: Output section
220: Input section
230: Landmark detecting section
240: Warping section
250: Pose estimating section
252: Parameter selecting section
260: Resizing section
270: Inference section
272: Learning section
280: inversely-resizing section
290: Inverse warping section
292: Output section

DETAILED DESCRIPTION

Hereinafter, exemplary embodiments of the invention will be described in detail with reference to the accompanying drawings.

FIG. 1 is a diagram illustrating an object image improving apparatus according to an exemplary embodiment of the invention.

An object image improving apparatus 100 detects a bounding-box from an input image. The object image improving apparatus 100 detects a bounding-box including an object that is defined in advance. The object image improving apparatus 100 detects positions of landmarks of the object. The object image improving apparatus 100 determines a direction or an angle of the object on the basis of the landmarks, and performs warping so that the object faces the front to align the landmarks and to rotate the object. The object image improving apparatus 100 resizes the size of the warped object image to a target size for normalization.

The object image improving apparatus 100 restores the aligned object to a high-quality image using an inference device based on normalized learning data. The object image improving apparatus 100 resizes the restored image of the object that faces the front to an original size, rotates the resized object image in an original direction or at an original angle, and then, inserts the result into the corresponding image. Through the above-mentioned process, it is possible to naturally restore the object image.

The object image improving apparatus 100 detects a bounding-box for detecting an object position in an input image. The object image improving apparatus 100 detects landmarks that are main features of the object in the bounding-box. The object image improving apparatus 100 performs warping for aligning the object position at a central position or a reference position on the basis of the detected landmarks.

The object image improving apparatus 100 resizes the warped object image to a target size corresponding to a learning model. For example, in a case where a deep learning network (learning model) learned to improve an image to a size of 128×128 is used, the object image improving apparatus 100 resizes the warped object image to a pre-learned target size 128×128 for improvement.

The object image improving apparatus 100 improves the quality of the resized image. In improving the quality of the resized image, in a case where an object angle deviates from the front, the object image improving apparatus 100 performs object pose estimation to estimate the object angle.

The object image improving apparatus 100 improves the quality of the resized image by performing an inference process to which the pre-learned deep learning model is applied. In improving the quality of the resized image using the pre-learned deep learning model, the object image improvement apparatus 100 improves the quality of the resized image by performing inference using a learning model learned on the basis of the aligned object image or using a learning model learned on the basis of the image of which the object angle deviates from the front.

The object image improving apparatus 100 inversely resizes the improved object image to an original size. The object image improving apparatus 100 performs inverse warping for inverting the inversely-resized image to the original object position.

In order to smoothly operate a deep learning model in a general environment, a training environment and a test environment should be located in similar domains. Accordingly, in order to match the domains of the training environment and the test environment, the object image improving apparatus 100 detects a bounding-box, detects landmarks, performs warping to align an object image at a central position or a reference position, and resizes the result to a target size, for training data to be used in the training environment, in the same way as in the test environment.

The object image improving apparatus 100 according to the embodiment of the invention includes an input section 110, a bounding-box detecting section 120, an object recognizing section 130, a model selecting section 140, an object image improving section 150, a segmentation section 160, a background extracting section 170, a background image improving section 180, a blending section 190, and an output section 192. The components included in the object image improving apparatus 100 are not necessarily limited thereto, and all or parts of the components included in the object image improving apparatus 100 may be used in combination.

The input section 110 receives an input image in which a plurality of objects and a background image are combined. The bounding-box detecting section 120 detects a plurality of bounding-boxes including an object that is defined in advance in the input image. Here, an ID may be assigned to each bounding-box.

In a case where n bounding-boxes are detected by the bounding-box detecting section 120, the object recognizing section 130 designates which of pre-defined objects the input n bounding boxes correspond to.

The model selecting section 140 generates a model selection signal for selecting a model suitable for a recognized object. The model selecting section 140 generates n pieces of model selection information by performing the process of selecting a model suitable for the object, with respect to each object.

The object image improving section 150 detects landmarks that are main features of each object in each bounding-box. The object image improving section 150 performs warping for aligning an object position at a central position or a reference position on the basis of the landmarks to generate a warped object image. The object image improving section 150 performs inference so as to improve the warped object image using a pre-learned object leaning model to generate an improved object image. The object image improving section 150 performs inverse warping for inverting the improved object image in an original direction of the object or at the original angle of the object to generate an inversely-warped object image. The object image improving section 150 performs the process of improving the object image for each bounding-box.

The segmentation section 160 performs segmentation for the inversely-warped object image. The segmentation section 160 performs the process of segmenting the inversely-warped object image for each bounding box. The segmentation section 160 may be positioned anywhere between the inference section 270 and the blending section 190.

The background extracting section 170 extracts a background image from the input image. Here, the background image may be a full display or a display obtained by excluding a bounding-box area from the full display. The background image improving section 180 performs inference so as to improve the background image using a pre-learned background image learning model to generate an improved background image.

The blending section 190 blends the inversely-warped object image and the improved background image to generate a blended image. Here, various image processing methods may be selectively employed as the blending method. For example, a method of averaging, with respect to a certain area near a boundary line between the inversely-warped object image and the background image, weights corresponding to distances to the boundary line using alpha-blending, or a method of simply pasting the inversely-warped object image on the background area may be used for blending.

The output section 192 outputs the blended image as an output image. At this time, a variety of data processing corresponding to an output data format necessary for output may be performed.

Figure 2B:
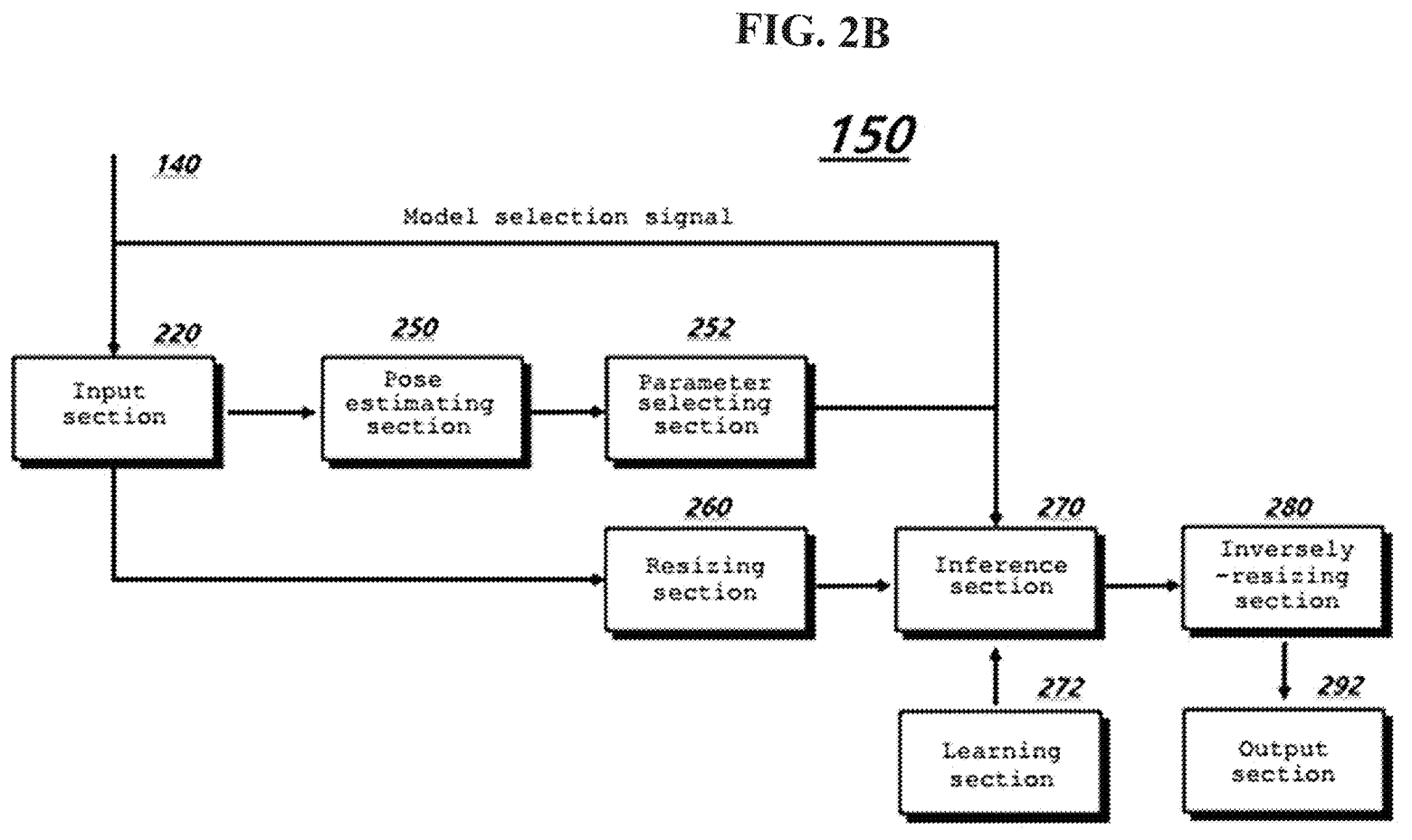

FIGS. 2A and 2B are diagrams illustrating the object image improving section according to the exemplary embodiment of the invention.

The object image improving section 150 shown in FIG. 2A includes an input section 220, a landmark detecting section 230, a warping section 240, a pose estimating section 250, a parameter selecting section 252, a resizing section 260, an inference section 270, a learning section 272, an inversely-resizing section 280, an inverse warping section 290, and an output section 292. The components included in the object image improving section 150 are not necessarily limited thereto, and all or parts of the components included in the object image improving section 150 may be used in combination.

The respective components included in the object image improving section 150 are connected to a communication path connecting software modules or hardware modules inside the apparatus, and may organically cooperate with each other. These components perform communication using one or more communication buses or signal lines.

Each component of the object image improving section 150 refers to a unit or section that processes at least one function or operation, and may be implemented as a software module, a hardware module, or a combination of software and hardware.

The input section 220 receives n bounding-boxes detected by the bounding-box detecting section as inputs. The bounding-box detecting section 230 detects landmarks that are main features of an object in each bounding-box.

The warping section 240 performs warping for aligning an object position at a central position or a reference position on the basis of the landmarks to generate a warped object image. The warping section 240 aligns a reference feature point included in the landmarks to be positioned on a predetermined fixed line.

In aligning the reference feature point to be positioned on the predetermined fixed line, the warping section 240 warps the object image by performing rotation in only a roll direction among 6 axes of the aligned object image clockwise or counterclockwise. In aligning the reference feature point to be positioned on the predetermined fixed line, the warping section 240 may warp the object image by performing rotation in all the 6 axes of the object image.

The warping section 240 finds main feature points of the landmarks, and extracts a midpoint of an upper horizontal axis (x') that connects upper features among the main feature points. The warping section 240 extracts a midpoint of a lower horizontal axis that connects lower features among the main feature points. The warping section 240 connects the midpoint of the upper horizontal line (x') and the midpoint of the lower horizontal axis line with a vertical axis line (y'). The warping section 240 performs the warping on the basis of the upper horizontal axis line (x') and the vertical axis line (y') that connects the midpoint of the upper horizontal axis line (x') and the midpoint of the lower horizontal axis line.

The warping section 240 performs length correction corresponding to an aspect ratio of the object for each of the upper horizontal axis line (x') and the vertical axis line (y') that connects the midpoint of the upper horizontal axis line (x') and the midpoint of the lower horizontal axis line. The warping section 240 compares the upper horizontal axis line (x') with the vertical axis line (y') that connects the midpoint of the upper horizontal axis line (x') and the midpoint of the lower horizontal axis line in which the length correction is reflected. The warping section 240 determines a larger axis as a reliable axis as a result of the comparison, and performs the warping by performing rotation on the basis of the reliable axis.

For example, in aligning the reference feature point in the object image to be positioned on the predetermined fixed line, the warping section 240 warps the object image by performing rotation in only the roll direction clockwise or counterclockwise.

The pose estimating section 250 may preferably be connected to the input section 220, but may be connected to an output side of the warping section 240 or the resizing section 260.

The pose estimating section 250 calculates an object angle in an object image in a bounding-box, a warped object image, or a resized warped object image. In a case where it is determined that the object image needs to be rotated in a yaw direction or a pitch direction among the 6 axes in order to face the front, the pose estimating section 250 determines that the object image is a side object image that faces a side, and performs pose estimation for the object in the side object image to estimate the object angle. Information estimated by the pose estimating section 250 may be angles in various directions, and may be other information (information measurable from an image, such as a depth, length, height, brightness, and saturation), in which an estimated interval size, an estimated resolution, or the like of the information may be defined in various ways as necessary to estimate the information.

The parameter selecting section 252 selects a parameter corresponding to pose estimation information on the object angle, or the like.

The resizing section 260 resizes the warped object image to a predetermined target size to generate a resized warped object image.

The inference section 270 performs inference so as to improve the warped object image using a pre-learned object leaning model to generate an improved object image. The inference section 270 generates the improved object image obtained by improving the resized warped object image.

The inference section 270 improves, in a case where the warped object image is a front object image that faces the front, the quality of the warped object image using a restoring model learned on the basis of the front object image. The inference section 270 improves, in a case where the warped object image is a side object image that faces the side, the quality of the warped object image using a restoring model learned on the basis of the side object image.

In the object image improving apparatus 100, a training process and a test process are performed separately.

The learning section 272 generates restoring models obtained by learning results of improving the quality of the object images aligned at a specific position on the basis of landmarks in the training process, according to types of objects defined in advance. The learning section 272 detects a bounding-box for detecting an object position in an input image in the inference process. The learning section 272 detects landmarks that are main features of an object in the bounding-box. The learning section 272 performs warping to align the object position at a central position or a reference position on the basis of the detected landmarks.

The learning section 272 resizes the warped object image to a target size corresponding to a model to be learned. For example, in a case where a deep learning network (learning model) to be learned to improve an image to a size 128×128 is used, the object image improving apparatus 100 resizes the warped object image to a learning target size 128×128.

The learning section 272 learns the resized image and an image having an improved quality for the image. In learning the resized image, in a case where the angle of the object deviates from the front, the learning section 272 estimates the angle of the object by performing pose estimation on the object. By performing classification according to the estimated object angles (poses), it is possible to generate different inference networks for the respective angles.

The inversely-resizing section 280 inversely resizes the improved object image to an original size to generate an inversely-resized improved object image.

The inverse warping section 290 performs inverse warping for inverting the improved object image to the object position of the input image to generate an inversely-warped object image. The inverse warping section 290 inverts the inversely-resized improved object image to the object position of the input image. The output section 292 applies the inversely-warped object image to the input image (in this embodiment, the input bounding-box).

The object image improving section 150 shown in FIG. 2B includes the input section 220, the pose estimating section 250, the parameter selecting section 252, the resizing section 260, the inference section 270, the learning section 272, the inversely-resizing section 280, and the output section 292. The components included in the object image improving section 150 are not necessarily limited thereto, and all or parts of the components may be included in the object image improving section 150.

The respective components included in the object image improving section 150 are connected to a communication path connecting software modules or hardware modules inside the apparatus, and may organically cooperate with each other. These components perform communication using one or more communication buses or signal lines.

Each component of the object image improving section 150 shown in FIG. 2B refers to a unit or section that processes at least one function or operation, and may be implemented as a software module, a hardware module, or a combination of software and hardware.

The input section 220 receives, as inputs, a bounding-box including an object defined in advance and information on a model selected to improve an object image included in the bounding-box.

The pose estimating section 250 calculates an angle of the object in the bounding-box.

In a case where it is determined that the object image needs to be rotated in a yaw direction or a pitch direction among the 6 axes in order to face the front, the pose estimating section 250 determines that the object image is a side object image that faces a side, and performs pose estimation for the object in the side object image to estimate the object angle.

Information estimated by the pose estimating section 250 may be angles in various directions, and may be other information (information measurable from an image, such as a depth, length, height, brightness, and saturation), in which an estimated interval size, an estimated resolution, or the like of the information may be defined in various ways as necessary to estimate the information.

The parameter selecting section 252 selects a parameter corresponding to pose estimation information on the object angle, or the like.

The resizing section 260 resizes the object image to a predetermined target size to generate a resized object image.

The inference section 270 performs inference so as to improve the object image in the resized input image (in this embodiment, the input bounding-box) using a reasoner in which the parameter selected by the selecting section 252 is applied, with respect to pose estimation information on the object angle or the like, to generate an improved object image. That is, the inference section 270 generates the improved object image obtained by improving the resized object image.

In a case where the object angle estimated by the pose estimating section 250 is, for example, between 0 and 30°, the inference section 270 improves the quality of the object image using a restoring model learned with parameters corresponding to side object images having an object angle between 0 and 30°. In a case where the object angle estimated by the pose estimating section 250 is, for example, between 31° and 60°, the inference section 270 improves the quality of the object image using a restoring model learned with parameters corresponding to side object images having an object angle between 31° and 60°. In a case where the object angle estimated by the pose estimating section 250 is, for example, between 61° and 90°, the inference section 270 improves the quality of the object image using a restoring model learned with parameters corresponding to side object images having an object angle between 61° and 90°. Here, parameters to be applied to respective angle ranges are selected by the parameter selecting section 252, generated parameter selection information signals are applied to the inference section as inputs, and the learned restoring model with the parameters according to the selected angle range by the inference section 270 may be applied.

Information estimated by the pose estimating section 250 may be angles in various directions, and may be other information (information measurable from an image, such as a depth, length, height, brightness, and saturation), in which an estimated interval size, an estimated resolution, or the like of the information may be defined in various ways as necessary to estimate the information.

The learning section 272 may generate a learning model obtained by learning results obtained by improving various phenomena or deviations in which various object shapes change according to angles. The learning section 272 generates a restoring model obtained by learning a result of improving the quality of the deviated side object image during the training process.

The learning section 272 generates a 0~30° restoring model obtained by learning a result of improving the quality of a side object image deviated between 0 and 30°, for example. Further, the learning section 272 generates a 31~60° restoring model obtained by learning a result of improving the quality of a side object image deviated between 31° and 60°, for example. Further, the learning section 272 generates a 61~90° restoring model obtained by learning a result of improving the quality of a side object image deviated between 61° and 90°, for example. Here, learning range attributes may be angles or other information (information measurable from an image, such as a depth, length, height, brightness, and saturation), in which an interval size, a resolution, or the like of the information may be defined in various ways as necessary to be applied for learning and estimation.

The inversely-resizing section 280 generates an inversely-resized improved object image by inversely resizing the improved object image to its original size. The output section 292 applies the inversely-resized improved object image to the input image (in this embodiment, the input bounding-box).

FIG. 3 is a diagram illustrating an object image improving process according to an exemplary embodiment of the invention.

As shown in (a) of FIG. 3, the object image improving apparatus 100 receives an input image. An object may exist in various positions in the input image.

As shown in (b) of FIG. 3, the object image improving apparatus 100 detects an area where the object is located in the input image. The object image improving apparatus 100 extracts landmarks including main features in the object area. In other words, the object image improving apparatus 100 detects a bounding-box from the input image, and detects landmarks that are main features of the object in the bounding-box.

As shown in (c) of FIG. 3, the object image improving apparatus 100 performs warping for aligning the object at a central position (front facing position) or a reference position on the basis of the extracted landmarks. In other words, the object image improving apparatus 100 generates a warped object image by performing warping for aligning the object position at the central position or the reference position on the basis of the landmarks.

As shown in (d) of FIG. 3, the object image improving apparatus 100 generates an improved object image by performing inference for improving the warped object image using a pre-learned learning model. In other words, the object image improving apparatus 100 performs super-resolution (SR) for improving the image aligned at the central position (front facing position) or the reference position.

The object image improving apparatus 100 may use the super-resolution (SR) when improving the warped object image. Here, the super resolution (SR) is a technique for restoring a small-sized and deteriorated low-quality image into a large-sized and high-quality image. For example, by applying the SR to an image captured by a CCTV, it is possible to improve an unclear object in an image having a small size and low quality to an object having a large size and high quality to restore the image to a level at which the object in the image can be identified. The object image improving apparatus 100 up-scales the warped object image, or restores the warped object image to an object learned using artificial intelligence.

As shown in (e) of FIG. 3, the object image improving apparatus 100 performs inverse warping for inverting the improved image. In other words, the object image improving apparatus 100 generates an inversely-warped object image by performing inverse warping for inverting the improved object image to the object position of the input image, and applies the inversely-warped object image to the input image.

Figure 4:
FIG. 4 is a diagram illustrating bounding-box detection and landmark position detection according to an exemplary embodiment of the invention.

FIG. 4 is a diagram illustrating bounding-box detection and landmark position detection according to an exemplary embodiment of the invention.

The object image improving apparatus 100 may use a deep learning-based technique for the bounding-box detection and the landmark detection, and may use deep learning having a RetinaFace structure, for example.

The object image improving apparatus 100 detects a bounding-box from an input image, and detects an object in the bounding-box. The object image improving apparatus 100 detects landmarks from the detected object to extract main features of the object.

The object image improving apparatus 100 aligns the landmarks by performing warping on the basis of the extracted landmarks to normalize object rotation. That is, the object image improving apparatus 100 performs rotation only in the roll direction among the yaw, pitch, and roll directions.

The object image improving apparatus 100 resizes the size of the aligned object to a learned model size to normalize the object size. The object image improving apparatus 100 trains a model specialized for each section of yaw and pitch using object pose estimation. The object image improving apparatus 100 applies the above-described processes to training and inference in the same order to improve generalization performance.

Since the training and inference are performed in the same format, the same method as that in the training is applied in the inference, so that the object improvement effect becomes high. That is, since the training is performed on the basis of the result obtained by detecting a bounding-box, detecting landmarks, and performing warping for aligning an object at a central position or a reference position in the same way as in the testing method, it is possible to obtain a high object image improvement effect.

In other words, since a result obtained by improving the quality of the image of the object that simply faces the front is not only learned during training, but a result obtained by improving the quality of the image after performing warping so that the object that faces a specific direction faces the front is also learned, various deviations that occur during warping can be learned in advance, and thus, it is possible to maximize the image quality improvement effect during actual testing.

During the training, in performing warping to align the object at the central position or the reference position to face the front, a learning model obtained by learning results obtained by improving various phenomena and deviations in which shapes of various objects change depending on angles may be created. In this case, during the training, only results obtained by improving front-facing images are learned.

Figure 5:
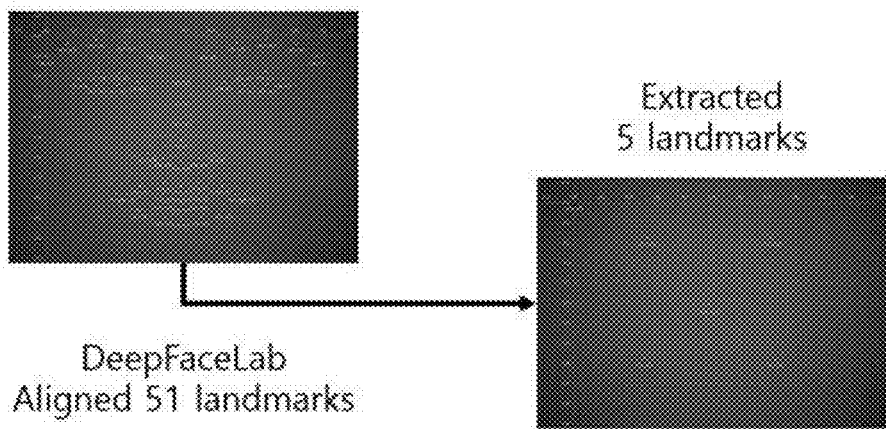
FIG. 5 is a diagram illustrating a warping process for an object image according to an exemplary embodiment of the invention.

FIG. 5 is a diagram illustrating an object image warping process according to an exemplary embodiment of the invention.

As shown in FIG. 5, the object image improving apparatus 100 extracts 5 landmarks corresponding to main features (for example, a left eye, a right eye, a nose, a left end of a mouth, and a right end of the mouth) from 51 landmarks that are aligned at the center of the DeepFaceLab library.

The object image improving apparatus 100 uses reference coordinates for aligning the 5 landmarks. The object image improving apparatus 100 detects the 5 landmarks from an input object image, aligns the detected landmarks on the reference coordinates, and aligns the objects at a central position. The object image improving apparatus 100 acquires an input image normalized in a roll direction among 6 axes (yaw, pitch, and roll) using the above-described process.

In warping the object in the bounding-box, the object image improving apparatus 100 warps the object by performing rotation in the roll direction (clockwise or counterclockwise) among the 6 axes (yaw, pitch, and roll) of a 2D image. In performing warping for aligning the object at the central position or the reference position to face the front, in a case where a reference feature point is positioned on a predetermined fixed line on the basis of the landmarks, the object image improving apparatus 100 performs rotation in the roll direction (clockwise or counterclockwise) to warp the object.

In warping the object in the bounding-box, in a case where it is determined that rotation is necessary in the yaw direction or pitch direction among the 6 axes of the 2D image, the object image improving apparatus 100 performs pose estimation for the object. The object image improving apparatus 100 performs the object pose estimation to estimate how much the angle of the object (in the yaw direction or pitch direction) deviates from the front.

In warping the object in the bounding-box, the object image improving apparatus 100 may perform rotation not only in the roll direction but also in the yaw direction or the pitch direction. In the training process, the object image improving apparatus 100 may generate each specialized restoring model obtained by learning a result of improving the object-warped image by performing rotation in the yaw direction, the pitch direction, and the roll direction.

Figure 6:
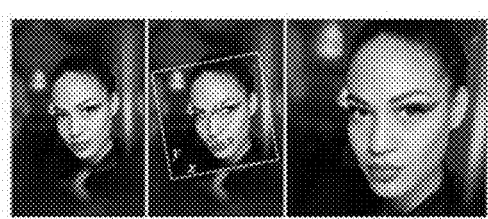
FIG. 6 is a diagram illustrating the warping process according to the exemplary embodiment in detail.
Figure 6:
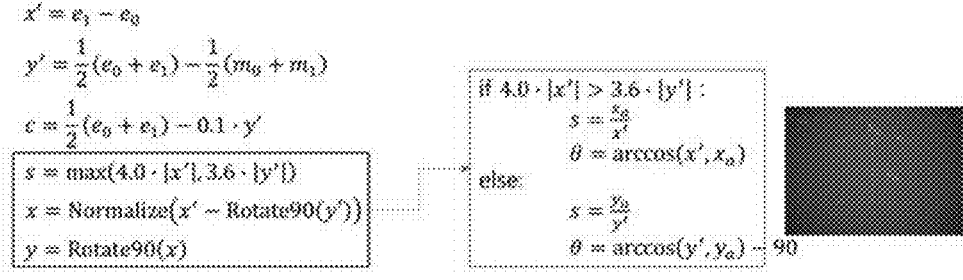

FIG. 6 is a diagram illustrating the warping process according to the exemplary embodiment in detail.

As shown in FIG. 6, the object image improving apparatus 100 assumes a longer line among x' and y' as a line that represents an object. In a case where the landmarks are incorrectly estimated or the object is excessively rotated, robust alignment may be performed.

As shown in FIG. 6, the object image improving apparatus 100 finds feature points of landmarks in order to align the object. The object image improving apparatus 100 extracts a midpoint of an upper horizontal axis (x') that connects upper features among the main feature points. The object image improving apparatus 100 extracts a midpoint of a lower horizontal axis that connects lower features among the main feature points. The object image improving apparatus 100 connects the midpoint of the upper horizontal line (x') and the midpoint of the lower horizontal axis line with a vertical axis line (y').

The object image improving apparatus 100 rotates the vertical axis line (y') by 90° in a counterclockwise direction. The object image improving apparatus 100 calculates a value obtained by adding an x-axis vector and a y-axis vector. The object image improving apparatus 100 may determine how much to rotate the object for alignment on the basis of the value obtained by adding the x-axis vector and the y-axis vector. Using the above-mentioned method, in a case where there is an inclination in the object, it is possible to align the object at the central position or the reference position while correcting the inclination.

In general, in a case where the horizontal axis line (x') and the vertical axis line (y') are accurately predicted, a stable operation is obtained. However, in general, in a case where any one of the horizontal axis line (x') and the vertical axis line (y') is incorrectly predicted (in a case where the landmarks are incorrectly estimated), an incorrect result is obtained.

Accordingly, the object image improving apparatus 100 according to the present embodiment determines which axis better reflects the entire object among the upper horizontal axis line (x') and the vertical axis line (y') that connects the midpoint of the upper horizontal axis (x') and the midpoint of the lower horizontal axis, and uses only the better axis for alignment.

The object image improving apparatus 100 determines a larger axis among the upper horizontal axis line (x') and the vertical axis line (y') that connects the midpoint of the upper horizontal axis (x') and the midpoint of the lower horizontal axis as a more reliable axis.

For example, in a case where it is determined that the horizontal axis line (x') is shorter than the reference value, the object image improving apparatus 100 recognizes that the upper horizontal axis line (x') is an incorrectly estimated value. The object image improving apparatus 100 ignores the upper horizontal axis line (x'), and aligns the object to be positioned at the central position only on the basis of the vertical axis line (y') that connects the midpoint of the upper horizontal axis (x') and the midpoint of the lower horizontal axis.

The object image improving apparatus 100 first performs length correction for each of the upper horizontal axis line (x') and the vertical axis line (y') that connects the midpoint of the upper horizontal axis (x') and the midpoint of the lower horizontal axis. The object image improving apparatus 100 compares the upper horizontal axis line (x') and the vertical axis line (y') that connects the midpoint of the upper horizontal axis (x') and the midpoint of the lower horizontal axis in which the length correction is reflected. As a result of the comparison, the object image improving apparatus 100 determines a larger axis as a reliable axis. The object image improving apparatus 100 calculates a scale value (s) for determining how much to enlarge or reduce the object, and an angle value (θ) for determining how much to rotate the object, on the basis of the reliable axis. According to the above-mentioned method, it is possible to greatly improve performance.

Figure 7:
FIG. 7 is a diagram illustrating warping of a plurality of images according to an exemplary embodiment of the invention.

FIG. 7 is a diagram illustrating warping of a plurality of images according to an exemplary embodiment of the invention.

As a result of comparing a general warping method with the warping method according to the present embodiment, the object image improving apparatus 100 has an advantage in that the object has a uniform size regardless of the object ratio and the reference feature points are located on the same line.

The object image improving apparatus 100 extracts landmarks including main features in an object area. The object image improving apparatus 100 places the line of the object area on a fixed line on the basis of the landmarks.

The object image improving apparatus 100 performs warping in such a manner as to predict a transform on the basis of feature points of the landmarks. The object image improving apparatus 100 may use similarity transform, affine transform, perspective transform, or the like as the transform during warping.

The object image improving apparatus 100 may predict parameters to be converted by generating simultaneous equations for conversion on the basis of the feature points of the landmarks. The object image improving apparatus 100 may predict parameter values of a scale enlargement value, an angle value, an X-axis inclination, and a Y-axis inclination using the simultaneous equations.

As shown in FIG. 7, during warping, distortion may occur on the object, or the scale of the object may not maintain a uniform ratio. In the case of an adult object image, the scale may decrease during warping, and in the case of a child object image, the scale may increase during warping. In the case of the child object image, since a distance between the eyes and the mouth is narrow, in a case where the image is aligned at a central position, the scale increases, whereas in the case of the adult object image, the scale decreases in the opposite manner.

Accordingly, in order to solve the above-mentioned problem, the object image improving apparatus 100 according to the present embodiment always places the eye line in the same area in a rectangular state, and adjusts the size of the object to almost the same size. Since the size of the object is almost the same, regardless of ages, the object has almost the same ratio.

The object image improving apparatus 100 resizes the warped object image to a target size (for example, 1024× 1024) corresponding to a learning model. In improving the quality of the image resized to the target size, the object image improving apparatus 100 analyzes and improves features for all scales of the image using a multi-scale engine.

Figure 8:
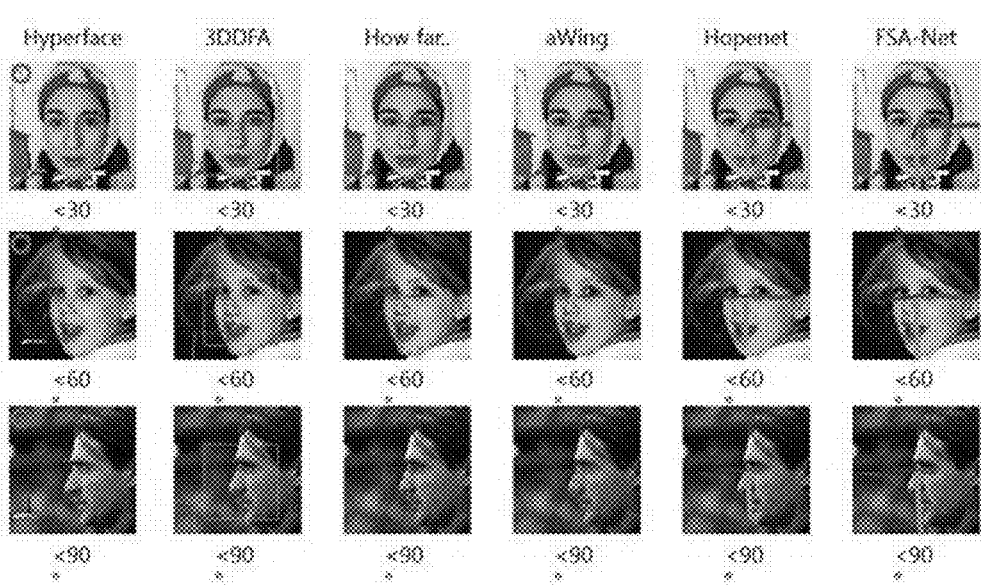
FIG. 8 is a diagram illustrating object pose estimation according to an exemplary embodiment of the invention.

FIG. 8 is a diagram illustrating object pose estimation according to an exemplary embodiment of the invention.

The object image improving apparatus 100 may use a deep learning-based technique for object pose estimation, and preferably may use an FSA-Net structure.

In performing warping for aligning the object at the central position or the reference position to face the front, the object image improving apparatus 100 places a reference line of the object on a constantly fixed line on the basis of the landmarks.

Accordingly, in a case where the object in the input image is turned to the side or its angle deviates from the front, considering that it is difficult to cope with such a pose change, the object image improving apparatus 100 additionally performs pose estimation for the object. The object image improving apparatus 100 performs the object pose estimation to predict how much the angle of the object deviates from the front.

In a case where the warped object image is a front object image that faces the front, the object image improving apparatus 100 improves the quality of the warped object image (front object image that faces the front) using a restoring model learned on the basis of the front object image.

In a case where the warped object image is an object image that faces a side, the object image improving apparatus 100 improves the quality of the warped object image (object image that faces the side) using a restoring model learned on the basis of the side object image.

In other words, in a case where the warped object image is the object image that faces the side, the object image improving apparatus 100 extracts a restoring model suitable for the angle at which the object deviates from the front. The object image improving apparatus 100 improves the quality of the warped object image (the object image that faces the side) using the restoring model suitable for the angle at which the object deviates from the front.

The object image improving apparatus 100 compares the warped object image with a reference frontal image (template), and recognizes, in a case where the warped object image differs from the reference frontal image (template) by a predetermined threshold or greater, that the warped object image is a side object image. In a case where the warped object image is recognized as the side object image, the object image improving apparatus 100 performs pose estimation for the object to predict a deviated angle of the object.

The object image improving apparatus 100 generates a 0~30° restoring model by learning a result of improving the quality of a side object image deviated at an angle between 0 and 30° in the training process. In a case where the warped image is determined as the side object image, and in a case where the deviated object angle is determined between 0 and 30° as a result of the pose estimation, the object image improving apparatus 100 improves the quality of the warped image using the 0~30° restoring model.

The object image improving apparatus 100 generates a 31~60° restoring model learned from a result of improving the quality of a side object image deviated at an angle between 31° and 60° in the training process. In a case where the warped image is determined as the side object image, and in a case where the deviated object angle is determined between 31° and 60° as a result of the pose estimation, the object image improving apparatus 100 improves the quality of the warped image using the 31~60° restoring model.

The object image improving apparatus 100 generates a 61~90° restoring model learned from a result of improving the quality of a side object image deviated at an angle between 61° and 90° in the training process. In a case where the warped image is determined as the side object image, and in a case where the deviated object angle is determined between 61° and 90° as a result of the pose estimation, the object image improving apparatus 100 improves the quality of the warped image using the 61~90° restoring model.

Figure 9:
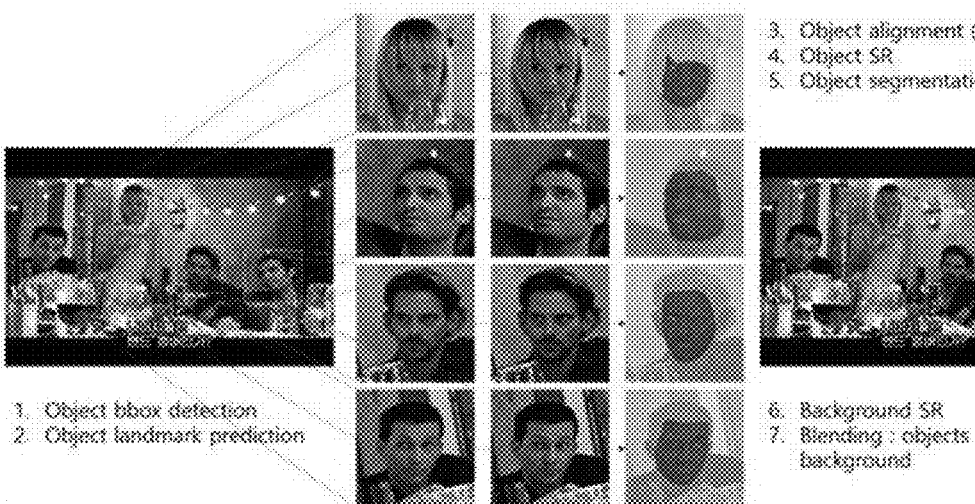
FIG. 9 is a diagram illustrating a method for improving a plurality of objects in one frame according to an exemplary embodiment of the invention.

FIG. 9 is a diagram illustrating a method for improving a plurality of objects in one frame according to an exemplary embodiment of the invention.

The object image improving apparatus 100 may be applied to a video, or may be applied to a case where a plurality of objects exists in one frame. The object image improving apparatus 100 detects a bounding-box for each object, detects landmarks in each bounding-box, and performs warping for aligning the object at a central position or a reference position using the landmarks.

The object image improving apparatus 100 performs inference for a warped image to improve the quality of the image, and then, performs inverse warping for the improved warped image to an original object position. In inserting the inversely-warped object image to the input image, the object image improving apparatus 100 first performs segmentation, and then inserts the inversely-warped object image only into an area recognized as an object area.

For example, in a case where two or more objects adjacently exist in one bounding-box, since an adjacent object may be processed as a background if the inversely-warped image is inserted on the basis of the bounding-box as it is, the object image improving apparatus 100 performs segmentation for the input image to mask the object area, and then, blends only the object area in the entire image. Here, an object that is located at the central position or the reference position in one bounding-box is selected as the object of the bounding-box, and other objects are masked as a background.

The object image improving apparatus 100 may also improve the quality of the image for a background area other than the bounding-box in the image, and may blend the background area and the object area.

The object image improving apparatus 100 divides the objects and the background for segmentation. In a case where a plurality of objects adjacently exists, the object image improving apparatus 100 performs segmentation separately. The object image improving apparatus 100 may assign an identifier (ID) to each object. In performing inference, the object image improving apparatus 100 separately improves the quality of the image for the background.

Figure 10:
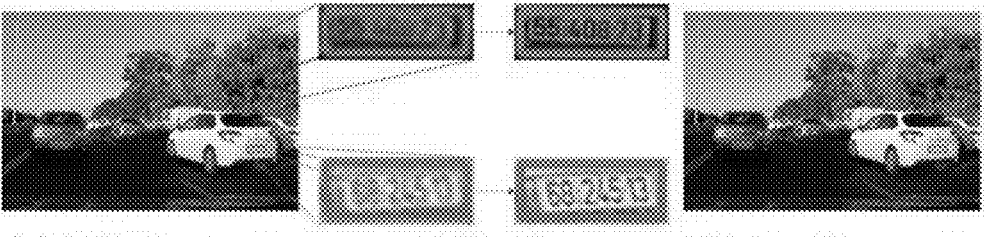
FIG. 10 is a diagram illustrating a method for improving a vehicle license plate according to an exemplary embodiment of the invention.

FIG. 10 is a diagram illustrating a method for improving a vehicle license plate according to an exemplary embodiment of the invention.

The object image improving apparatus 100 may be individually applied to each object included in a background. For example, in application to a vehicle license plate, the object image improving apparatus 100 may use a deep learning network (learning model) learned to restore numbers of the vehicle license plate.

The object image improving apparatus 100 may detect the vehicle license plates in a pre-processing step, and may then apply a pre-learned deep learning network (learning model) only to the license plate area. With respect to the object, landmarks may be extracted and applied.

For example, in a case where the object is a face, there are landmarks for the eyes, nose, and mouth. In a case where the object is a vehicle license plate, there are landmarks for numbers and texts having pre-assigned digits. In a case where the object is a vehicle, there are landmarks for a glass area, a wheel area or the like. Landmark features of all objects included in the image may be used.

The object image improving apparatus 100 may recognize all target objects from an input image, and may assign identifiers (IDs) to the objects. The object image improving apparatus 100 detects a bounding-box of each object for each ID. The object image improving apparatus 100 detects each object in the bounding-box. The object image improving apparatus 100 extracts landmarks including main features of each object.

The object image improving apparatus 100 performs warping for aligning the object to a central position (a front facing position) or a reference position on the basis of the extracted landmarks. The object image improving apparatus 100 performs super-resolution (SR) for improving the image aligned at the central position (front facing position) or the reference position. The facial image improving apparatus 100 performs inverse warping for inverting the improved image. The object image improving apparatus 100 inserts the inversely-warped image to the input image.

The above description is merely an example of the technical idea of the present inventive concept, and various modifications and variations can be made to those skilled in the art without departing from the concept of the present inventive concept. Accordingly, the above-described embodiments are not intended to limit the technical idea of the present inventive concept, and the scope of the technical idea of the present inventive concept is not limited by the embodiments. The scope of protection of the present inventive concept should be interpreted according to claims, and all technical ideas equivalent thereto should be interpreted as being included in the scope of the invention.

The invention claimed is:

1. An apparatus for improving an object image comprising:

one or more communication buses; and a plurality of software modules configured to perform communication using the one or more communication buses and process at least one operation for improving an object image, the plurality of software modules comprising:

an input module that receives an input image;

a bounding-box detecting module that detects a plurality of bounding-boxes from the input image;

an object recognizing module that recognizes an object in each of the bounding-boxes;

a background extracting module that extracts a background image from the input image;

an object image improving module that detects landmarks that are main features of each object, performs warping for aligning an object position at a central position or a reference position on the basis of the landmarks to generate a warped object image, performs inference so as to improve the warped object image using a first pre-learned object learning model specialized for improving at least one of normalized object images to generate an improved object image, and performs inverse warping for inverting the improved object image to the object position of the input image, wherein the inverse warping includes reversing of an angular alignment performed during the warping by rotating the improved object image in an original direction or at an original angle to generate an inversely-warped object image;

a background image improving module that performs inference so as to improve the background image using a second pre-learned background image learning model specialized for improving the background image to generate an improved background image, wherein the second pre-learned learning model is different from the first pre-learned learning model;

a segmentation module that segments the inversely-warped object image;

a blending module that blends the segmented inversely-warped object image and the improved background image to generate a blended image; and an output module that outputs the blended image as an output image.

2. An apparatus for improving an object image comprising:

one or more communication buses; and a plurality of software modules configured to perform communication using the one or more communication buses and process at least one operation for improving an object image, the plurality of software modules comprising:

an input module that receives a plurality of objects displayed in a bounding-box;

a landmark detecting module that detects landmarks that are main features of each of the objects;

a warping module that performs warping for aligning an object position at a central position or a reference position on the basis of the landmarks to generate a warped object image;

a resizing module that resizes the warped object image to a preset target size to generate a resized warped object image;

an inference module that receives the resized warped object image and performs inference so as to improve the resized warped object image in a resized bounding box using a pre-learned object learning model to generate an improved object image;

an inversely-resizing module that receives the improved object image from the inference module and inversely resizes the improved object image obtained by improving the resized warped object image by the inference module to an original size to generate an inversely-resized improved object image;

an inverse warping module that performs inverse warping for inverting the inversely-resized improved object image to the object position of the bounding-box to generate an inversely-warped object image; and an output module that applies the inversely-warped object image to the bounding-box.

3. The apparatus according to claim 2, wherein the warping module aligns a reference feature point included in the landmarks, of the object in the bounding-box, to be positioned on a predetermined fixed line.

4. The apparatus according to claim 3, wherein in aligning the reference feature point to be positioned on the predetermined fixed line, in a case where it is determined that the object image is a front object image that faces the front, the warping module performs the warping by rotating the front object image clockwise or counterclockwise only in a roll direction among 6 axes.

5. The apparatus according to claim 3, wherein in aligning the reference feature point to be positioned on the predetermined fixed line, the warping module performs the warping by rotating the object image clockwise or counterclockwise only in a roll direction among 6 axes.

6. The apparatus according to claim 2, wherein the warping module finds main feature points of the landmarks, extracts a midpoint of an upper horizontal axis (x') that connects upper features among the main feature points, extracts a midpoint of a lower horizontal axis that connects lower features among the main feature points, connects the midpoint of the upper horizontal line (x') and the midpoint of the lower horizontal axis line with a vertical axis line (y'), and performs the warping on the basis of the upper horizontal axis line (x') and the vertical axis line (y') that connects the midpoint of the upper horizontal axis line (x') and the midpoint of the lower horizontal axis line.

7. The apparatus according to claim 6,
wherein the warping module performs length correction corresponding to an aspect ratio of the object for each of the upper horizontal axis line (x') and the vertical axis line (y') that connects the midpoint of the upper horizontal axis line (x') and the midpoint of the lower horizontal axis line, compares the upper horizontal axis line (x') with the vertical axis line (y') that connects the midpoint of the upper horizontal axis line (x') and the midpoint of the lower horizontal axis line in which the length correction is reflected, determines a larger axis as a reliable axis as a result of the comparison, and performs the warping by performing rotation on the basis of the reliable axis.

8. The apparatus according to claim 2,
wherein the inference module improves, in a case where the warped object image is a front object image that faces the front, the quality of the warped object image using a restoring model learned on the basis of the front object image.

9. The apparatus according to claim 8, further comprising:
a pose estimating module that determines, in a case where it is determined that the warped object image needs to be rotated in a yaw direction or a pitch direction among the 6 axes in order to face the front, that the object image is a side object image that faces a side, and performs pose estimation for the object of the side object image to estimate an object angle; and
a parameter selecting module that selects a parameter corresponding to the object angle.

10. The apparatus according to claim 2,
wherein the inference module improves, in a case where the warped object image is a side object image that faces a side, the quality of the warped object image using a restoring model learned on the basis of the side object image.

11. A computer-implemented method for improving an object image, comprising:
receiving a plurality of objects displayed in a bounding-box;
detecting landmarks that are main feature of each of the objects;
performing warping for aligning an object position at a central position or a reference position on the basis of the landmarks to generate a warped object image;
resizing the warped object image to a preset target size to generate the resized warped object image;
receiving the resized warped object image and performing inference so as to improve the resized warped object image using a pre-learned object learning model in a resized bounding box to generate an improved object image;
receiving the improved object image from be performing of the inference and inversely resizing the improved object image generated by improving the resized warped object image to an original size to generate an inversely-resized improved object image;
performing inverse warping for inverting the inversely-resized improved object image to the object position of the bounding-box to generate an inversely-warped object image; and
applying the inversely-warped object image to the bounding-box.

* * * * *